United States Patent [19]

Giger et al.

[11] 4,023,348

[45] May 17, 1977

[54] POSITIONING ARRANGEMENT ON A FRAME MEMBER AND ON A PART HAVING TO BE SECURED THERETO

[75] Inventors: Urs Giger, Solothurn; Friedrich Perrot, Lengnau, both of Switzerland

[73] Assignee: ETA A.G. Ebauches-Fabrik, Switzerland

[22] Filed: Aug. 19, 1975

[21] Appl. No.: 605,836

[30] Foreign Application Priority Data

Aug. 19, 1974 Switzerland ..................... 11292/74

[52] U.S. Cl. ................................ 58/52 R; 29/179; 58/104

[51] Int. Cl.² .................... G04B 29/02; B23P 13/00

[58] Field of Search ................. 29/177, 179; 58/52, 58/52 A, 104, 127 B

[56] References Cited

UNITED STATES PATENTS 632,128 8/1899 Krahenbuhl ......................... 58/104

2,685,164 8/1954 Grillet et al. ........................ 58/104

*Primary Examiner*—E. S. Jackmon

*Attorney, Agent, or Firm*—Stevens, Davis, Miller & Mosher

[57] ABSTRACT

The balance cock 35, the train wheel bridge 36 and the barrel bridge 37 are positioned with great precision and univocally on the baseplate 40 by means of an arrangement comprising a pair of feet 38 on every bridge, elongated holes 39 in the baseplate being engaged by feet 38, and securing screws 42, 44, 45 driven into the baseplate 40. Each screw has a conical face on its head and it passes through an opening 41, 46 of the bridge. The conical face of each screw engages the edge of the corresponding bridge opening at one point, thus exerting a thrust on the bridge in the direction of the arrows causing each one of the two feet 38 of a bridge to bear against a plane side wall of the corresponding hole 39 and one foot of each bridge to bear against the rounded end face of its hole.

5 Claims, 5 Drawing Figures

POSITIONING ARRANGEMENT ON A FRAME MEMBER AND ON A PART HAVING TO BE SECURED THERETO

BACKGROUND OF THE INVENTION

1. Field of the Invention

This invention relates to the positioning arrangements on a frame member and on a part having to be secured thereto and more particularly to the positioning arrangements comprising a plane supporting face accommodated on the frame member to receive said part laid thereon, a securing means removably anchored to said frame member and having an axis being perpendicular to said plane supporting face and along which said securing means is movable relative to said frame member, an opening provided in said part for the passage therethrough of said securing means, said opening having an edge engageable by said securing means at a point located on a predetermined radius of the securing means, a conical surface provided on one of the interengaged elements at the point located on said predetermined radius, said conical surface being inclined in such manner that the securing means, upon moving along its axis toward said frame member, exerts a thrust on said part urging the same in the direction of said predetermined radius relative to said frame member, and holding means on said frame member preventing said part from sliding on said plane supporting face under the action of the thrust exerted thereon by said securing means.

2. The Prior Art

A positioning arrangement of that type is disclosed for instance in the U.S. Pat. No. 632,128. With these arrangements which are known in the art the position of said part on the frame member is either over-rigid or indefinite. As a consequence thereof, if said part is removed from the frame member and then mounted thereon again, it will not be secured thereto in exactly the same position as previously.

SUMMARY OF THE INVENTION

It is therefore an object of the invention to provide a positioning arrangement of the type above-mentioned, which, without complicating in any way the manufacture of the frame member and of the part which is to be secured thereto, will reduce the effects of the machining tolerances on the position in which said part will be secured on the frame member, and, above all, ensure that said part, after having been removed from the frame member, for instance for repair of the watch, will be secured in the very position it previously occupied, when it will be mounted again on the frame member.

A more particular object of the invention consists in providing a positioning arrangement of the type above-mentioned, in which said holding means comprise three abutting surface portions provided on said frame member and said part comprises three surface portions, each corresponding to one of said abutting surface portions of the frame member, each one of said three surface portions of said part abuttingly engaging the corresponding abutting surface portion of the frame member under the action of the thrust of said securing means when said part is secured to said frame member, said abutting surface portions of the frame member being arranged in such manner that every two ones of them constitute a guide-way along which said part may move under the action of the thrust of said securing means, the two surface portions of said part corresponding to the two abutting surface portions considered of the frame member thereby sliding on said two abutting surface portions until the third one of said surface portions of said part butts against the third one of said abutting surface portions of the frame member.

BRIEF DESCRIPTION OF THE DRAWINGS

Some embodiments of the positioning arrangement according to the invention are represented diagrammatically and by way of example in the accompanying drawings.

In the drawings.

DESCRIPTION OF THE PREFERRED EMBODIMENTS

Figure 1:
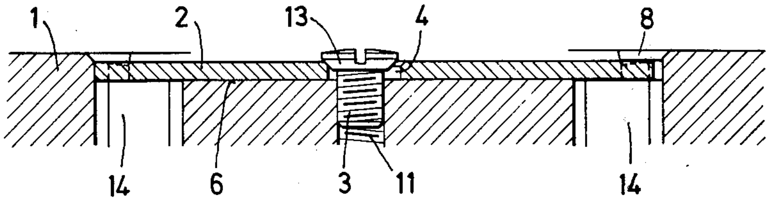
FIG. 1 is a sectional view of a first embodiment.

The first embodiment (FIGS. 1 and 2) relates to a frame member 1 which could be the baseplate of a watch movement. A part 2, which could be the balance cock of that watch movement, is removably secured onto member 1 by means of a screw 3. FIG. 1 shows that part 2 consists of a thin plate. Therefore, part 2 can be made by punching and thus be given a very precise contour. The section of part 2 represented in FIG. 2 has a substantially circular contour. In order to receive screw 3 part 2 is provided with a circular opening 4. Part 2, moreover, carries two ears 5 at its periphery, each one having the shape of three quarters of a circle. Opening 4 is coaxial to the circular section of part 2 and ears 5 are located at the two ends of a diameter of said section.

Figure 2:
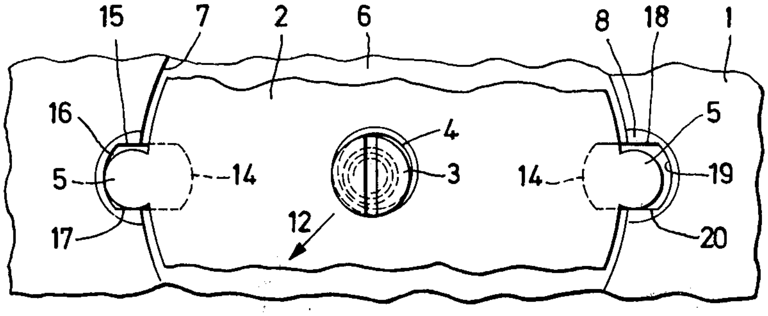
FIG. 2 is a plan view of that embodiment.

In order to receive part 2 member 1 has plane supporting face 6 consisting of the bottom face of a recess formed with a circular side wall 7. Two holes 14 have also been punched in member 1 for the accommodation of ears 5. Holes 14 have the same elongated shape. Each hole 14 has a wall comprising two plane side faces and two rounded end faces. The parts of the hole walls extending above face 6 form abutting faces 15, 16, 17 and 18, 19, 20, respectively, roughly positioning part 2, when the latter is placed in the recess (6, 7) of member 1. FIG. 2 shows that ears 5 have good free play between the plane abutting faces 15, 17 and 18, 20 and the rounded abutting faces 16 and 19. Consequently, part 2 can easily be placed onto the plane supporting face 6 either manually or automatically. Holes 14 extend half inside and half outside recess (6, 7). The hole edges extending on the full portion of member 1 are bevelled as shown at 8 thus facilitating mounting part 2 even more.

Member 1 is finally provided with a tapped bore 11 in order to be able to receive screw 3. However, bore 11 is not provided in the center of recess (6, 7); it is off-centered to a small extent in the direction of arrow 12. When part 2 lies in recess (6, 7) on the bottom thereof, bore 11 is, however, freely accessible through opening 4. Screw 3 can thus be driven into bore 11 without ado. This screw extends, however, through opening 4 in an eccentric position, so that the conical face of its head engages the edge of opening 4 only at one point, namely that one of said edge which is nearest the screw axis. Upon tightening screw 3 the latter thus exerts on part 2 at the point thereof engaged by the conical face 13 of the screw a thrust, the component of which being parallel to face 6 has the direction of arrow 12. Part 2 accordingly moves on face 6 under the action of that thrust until the surface portions of ears 5 facing the bottom of the drawing come in abutting engagement at their lowest points with the walls 17 and 20, and until the surface portion of the left ear 5 directed toward the left in the drawing comes in abutting engagement at its most left point with the wall 16 of member 1. To reach that definitive position part 2 can either slide toward the left along walls 17 and 20 until its left ear 5 butts against wall 16 or rotate about the center point of its left ear 5, if the latter already engages walls 16 and 17, until its right ear 5 butts against wall 20 or, finally, slide along walls 16 and 20 until its left ear 5 butts against wall 17. Every two ones of the three walls 16, 17, 20 thus constitute a guide-way for part 2, along which the corresponding surface portions of the latter may slide under the thrust generated by screw 3, this sliding occurring in a direction depending on that of the thrust along said guide-way, and lasting until a third surface portion of part 2 butts against the third one of said walls of member 1.

If part 2 has then to be removed from member 1 and to be mounted again, the thrust generated by screw 3 urges it exactly into the position it occupied on member 1 before disasssembling. That position is namely that, in which walls 16, 17, 20, constituting abutting faces, exert reacting forces on ears 5, which balance the thrust of screw 3.

Every time part 2 is mounted on member 1, after having been removed therefrom, this part is ensured to be secured to member 1 in the very position of FIG. 2 as soon as the tapped bore 11 has its axis in the third quadrant of recess (6, 7). A small inaccuracy of the coordinates of the axis of bore 11 within said third quadrant does not affect positioning part 2. However, the axis of bore 11 will preferably be located in the bisecting plane of said third quadrant in order to obtain a substantially uniform pressure of ears 5 against the corresponding abutting faces of member 1.

The position in which part 2 is finally secured onto member 1 solely depends on the ears 5 and on the holes 14. Since ears 5 as well as holes 14 can be formed by punching and thus have a very accurate shape, the positions of parts 2 made in series on the corresponding frame members will only slightly vary from one watch to another one of the same batch. A particular watch part 2 will always be secured onto member 1 in exactly the same position every time it is mounted again after having been removed.

Figure 3:
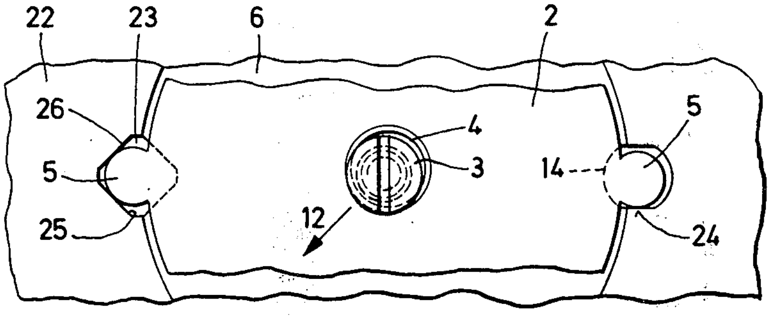
FIGS. 3 and 4 are plan views similar to FIG. 2, each showing a further embodiment.

The embodiment of FIG. 3 only differs from the first one by the shape of one of the holes provided in the frame member 22 for the accommodation of the ears 5 of part 2. Instead of an elongated hole, member 22 is provided with a square prismatic hole 23.

As in the first embodiment ears 5 of part 2 have good free play between the wall portions of holes 14 and 23, which extend above face 6 and roughly position part 2 on member 1. Upon tightening screw 3 the thrust exerted by the latter in the direction of arrow 12 urges ears 5 against the plane walls 24 and 25, 26 of holes 14 and 23, respectively. With this embodiment the position of part 2 on member 22 is ensured in just the same manner as with the first embodiment.

Figure 4:
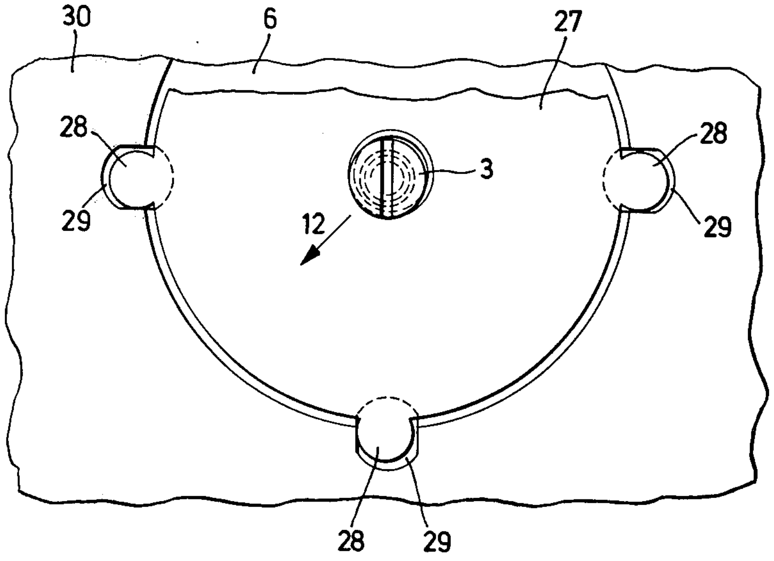

FIG. 4 shows a section of a watch part 27 carrying three identical ears 28 at its periphery. Three identically shaped elongated holes 29 are provided in the frame member 30 for the accommodation of the ears 28. The thrust exerted by screw 3 on part 27 in the direction of arrow 12, upon tightening said screw, urges each ear 28 into abutting engagement with a plane wall portion of the holes 29, so that the position of part 27 on member 30 is ensured as in the two first embodiments.

In the embodiments described above the surface portions, which are pressed by the fixing screw against abutting faces of the frame member, were located at the periphery of the part to be secured to the frame member. However, they could just as well be provided inside the contour of that element.

Figure 5:
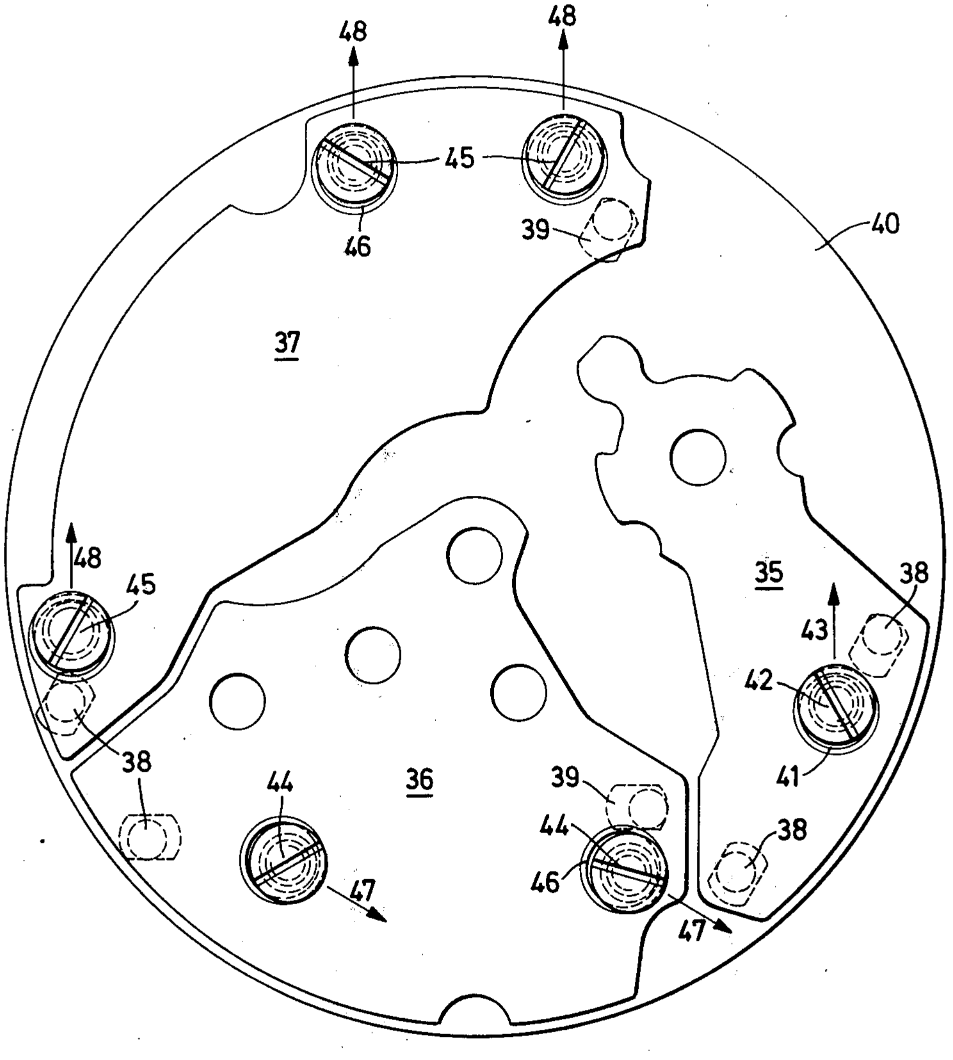
FIG. 5 is a plan view of a watch movement incorporating different embodiments of the improved positioning arrangement according to the invention.

In FIG. 5 those surface portions extend on cylindrical feet of the balance cock 35, of the train wheel bridge 36 and of the barrel bridge 37, respectively, each one of which carries a pair of feet 38. The two feet of every bridge enter parallel elongated holes 39 provided in the baseplate 40.

The screw 42, which eccentrically extends through the opening 41 of the balance cock 35, thrusts the latter in the direction of arrow 43 and causes the feet 38 thereof to bear against one of the plane side walls of both holes 39 and one of these feet 38 to bear against the rounded end wall of one of the holes 39. The balance cock 35 is thus positioned on the baseplate 40 in the same manner as member 2 in FIG. 2.

Positioning of the train wheel bridge and of the barrel bridge on the baseplate 40 occurs under the same conditions as for the balance cock. These bridges are, however, secured to the baseplate by more then one screw. The two baseplate bores in which are driven the fixing screws 44 of the train wheel bridge 36 and the three baseplate bores in which are driven the fixing screws 45 of the barrel bridge, are set off the axes of the corresponding openings 46 of these two bridges in such a manner that the thrusts of the fixing screws of the same bridge occur in parallel directions, indicated by arrows 47 and 48. Due to this provision, the succession according to which the fixing screws of the same bridge are tightened is immaterial; it affects in no way the position in which the bridge will finally be secured onto the baseplate.

What we claim is:

1. A positioning arrangement on a frame member and on a part to be secured thereto, comprising a plane supporting face on the frame member to receive said part laid thereon, a securing means removably anchored to said frame member and having an axis perpendicular to said plane supporting face and along which said securing means is movable relative to said frame member, an opening in said part for the passage therethrough of said securing means, said opening having an edge engageable by said securing means at a point located on a predetermined radius of the securing means, a conical surface on one of the securing means and the edge of the opening in the part at the point located on said predetermined radius, said conical surface being inclined in such manner that the securing means, upon moving along its axis toward said frame member, exerts a thrust on said part urging the same in the direction of said predetermined radius relative to said frame member, holding means on said frame member preventing said part from sliding on said plane supporting face under the action of the thrust exerted thereon by said securing means, said holding means comprising three abutting surface portions on said frame member, said part comprising three surface portions, each surface portion of said part corresponding to one of said abutting surface portions of the frame member, each one of said three surface portions of said part abuttingly engaging the corresponding abutting surface portion of the frame member under the action of the thrust of said securing means when said part is secured to said frame member, said abutting surface portions of the frame member being arranged in such manner that every two of them constitute a guide-way along which said part may move under the action of the thrust of said securing means, the two surface portions of said part, corresponding to the two of the abutting surface portions of the frame member, sliding on said two abutting surface portions of the frame member until the third one of said surface portions of said part butts against the third one of said abutting surface portions of the frame member.

2. An arrangement as claimed in claim 1, wherein said part consists of a punched flat piece, said surface portions of said part being defined on the contour of said punched flat piece.

3. An arrangement as claimed in claim 1, further comprising rough positioning means for positioning said part, said rough positioning means projecting from said frame member beyond said plane supporting face thereof and being arranged so as to receive said part with such free play therebetween that said opening for said securing means affords free access to means in said frame member for anchoring said securing means thereto.

4. An arrangement as claimed in claim 3, wherein said frame member has a recess defined therein having a side wall constituting said rough positioning means and a bottom face constituting said plane supporting face of said frame member.

5. An arrangement as claimed in claim 1, wherein said part is secured to said frame member by means of a plurality of securing members, an opening in said part for the passage of each one of said securing members, the openings of said part having axes each of which is offset in the same direction relative to the axis of the corresponding securing member, said securing members thus exerting thrusts on said part which are all directed in the same direction.

* * * * *